W. A. P. CATHCART.
MOTION PICTURE CAMERA SUPPORT.
APPLICATION FILED JAN. 4, 1916.
1,221,677.
Patented Apr. 3, 1917.
3 SHEETS—SHEET 2.
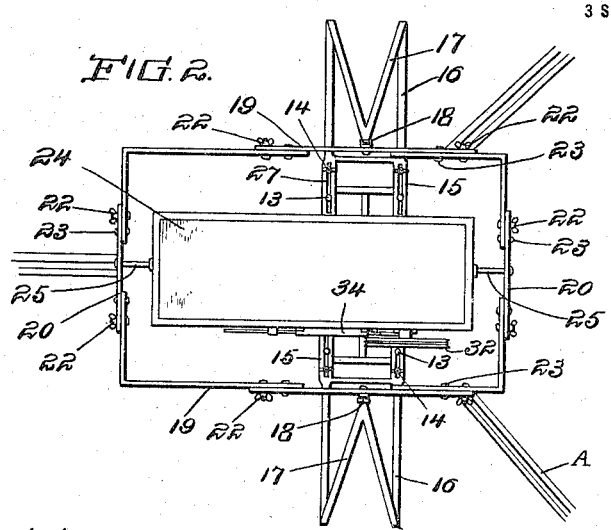
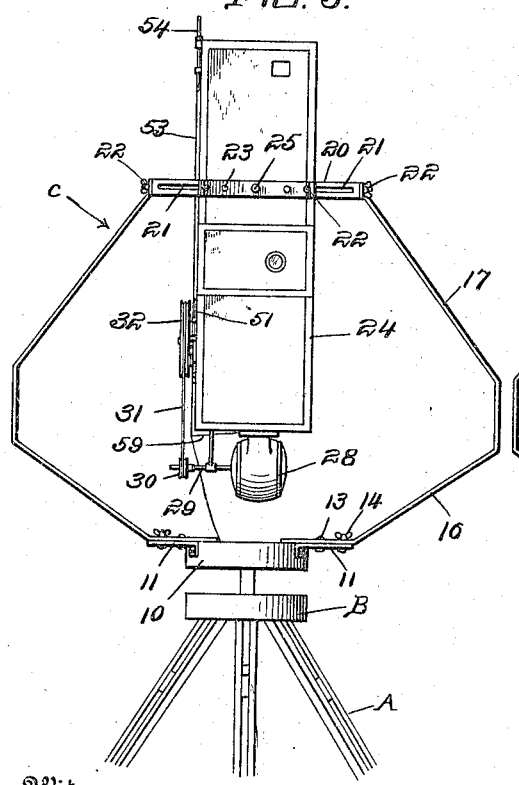
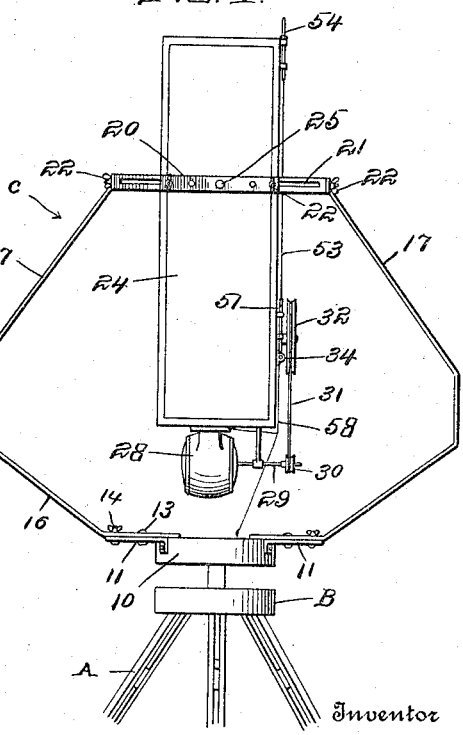
Witnesses
Inventor
W. A. P. Cathcart,
By Victor J. Evans
Attorney W. A. P. CATHCART.
MOTION PICTURE CAMERA SUPPORT.
APPLICATION FILED JAN. 4, 1916.
1,221,677.
Patented Apr. 3, 1917.
3 SHEETS—SHEET 3.
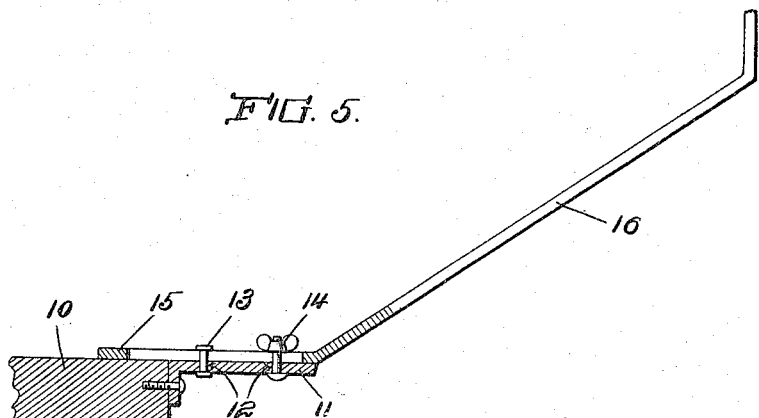
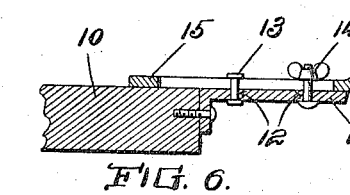
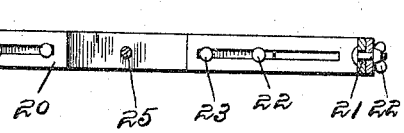
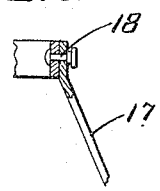
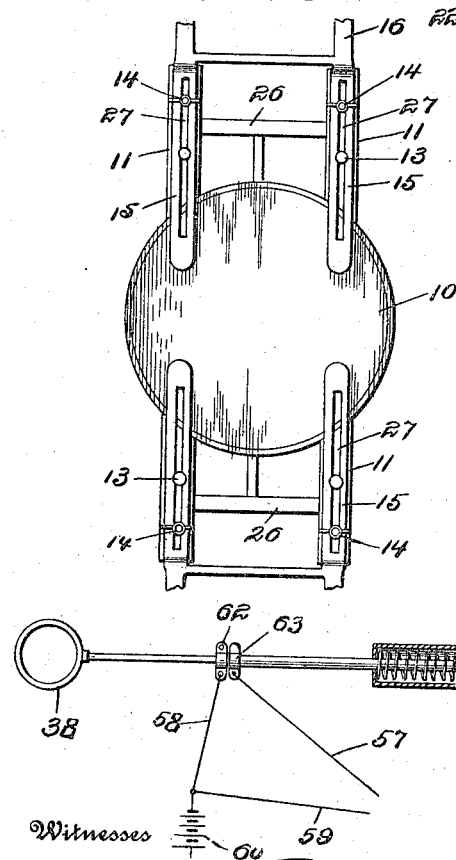
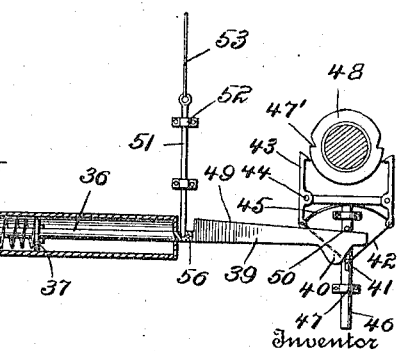
W. A. P. Cathcart,
Inventor
Witnesses
By Victor J. Evans
Attorney

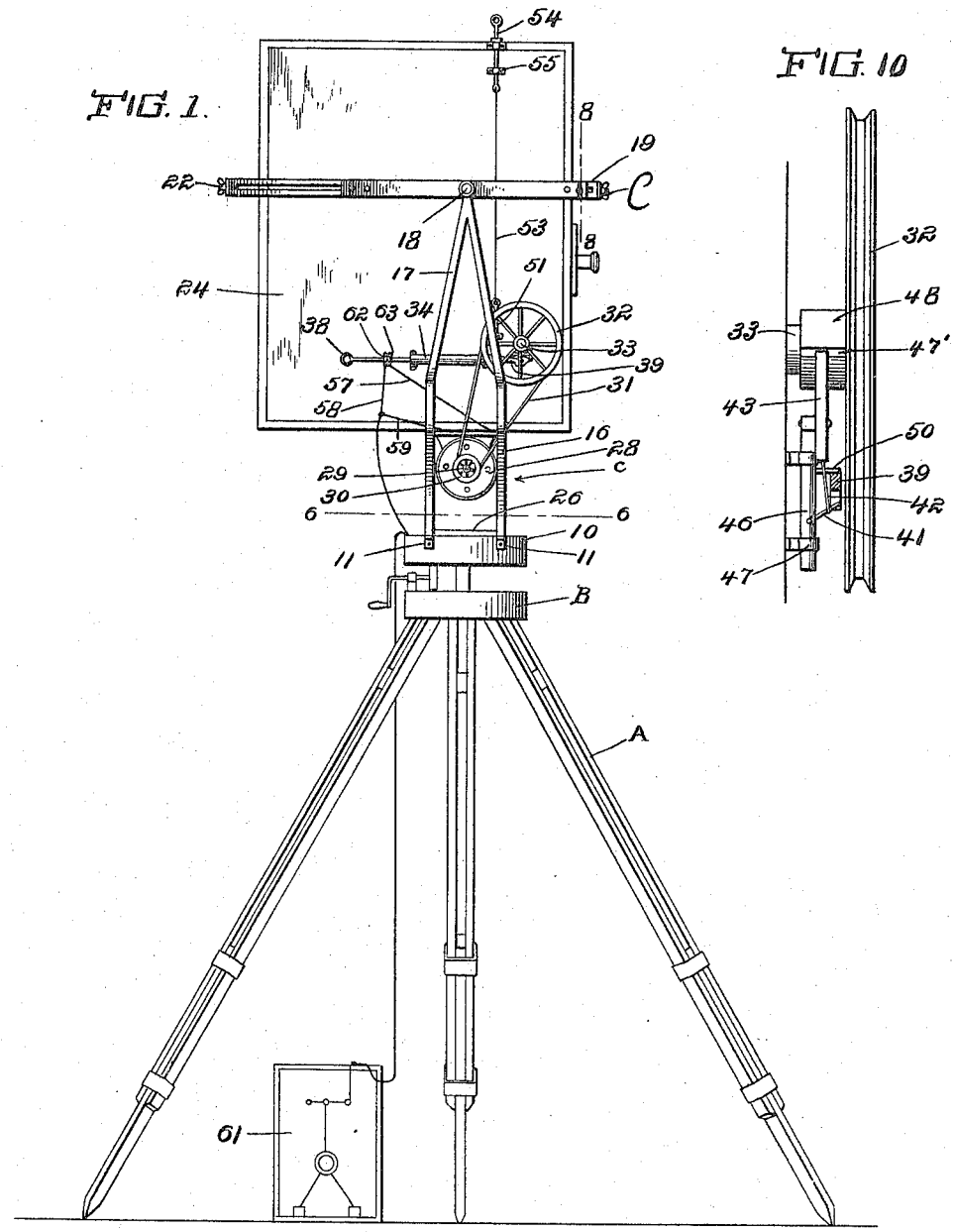

UNITED STATES PATENT OFFICE.

WILLIAM A. P. CATHCART, OF HONOLULU, TERRITORY OF HAWAII.

MOTION-PICTURE-CAMERA SUPPORT.

1,221,677.            Specification of Letters Patent.         Patented Apr. 3, 1917.

Application filed January 4, 1916. Serial No. 70,329.

*To all whom it may concern:*

Be it known that I, WILLIAM A. P. CATHCART, a citizen of the United States, residing at Honolulu, Territory of Hawaii, have invented new and useful Improvements in Motion-Picture-Camera supports, of which the following is a specification.

The invention relates to cameras, and more particularly to the class of motion picture camera supports for use on boats or other marine crafts or the like.

The primary object of the invention is the provision of a support of this character wherein the camera is mounted therein so that the same will be sustained level irrespective of the direction of the rolling or tilting action of the marine craft, thereby assuring the taking of perfect pictures for marine photoplays.

A further object of the invention is the provision of a support of this character wherein it can be readily and easily adjusted with despatch to accommodate various sizes of cameras.

A still further object of the invention is the provision of a support of this character wherein the construction thereof is novel in form to assure the true level of the camera at all times.

A still further object of the invention is the provision of a support of this character which is simple in construction, thoroughly reliable and efficient in its operation, strong, durable and inexpensive of manufacture.

Other objects will be in part obvious and in part hereinafter pointed out.

The invention accordingly consists in the features of construction, combination of elements and arrangements of parts which will be exemplified in the construction hereinafter set forth, and the scope of the application of which will be indicated in the claim hereunto appended.

In the accompanying drawings:

Figure 1 is a side elevation of a camera, showing the support constructed in accordance with the invention;

Fig. 2 is a top plan view;

Fig. 3 is a front elevation;

Fig. 4 is a rear elevation;

Fig. 5 is a fragmentary vertical longitudinal sectional view;

Fig. 6 is a sectional view on the line 6—6 of Fig. 1;

Fig. 7 is a detail view of the circuit closer and lock, showing the spring barrel in section;

Fig. 8 is a sectional view on the line 8—8 of Fig. 1.

Similar reference characters indicate corresponding parts throughout the several views in the drawings.

Referring to the drawings in detail, A designates generally an extensible tripod of the ordinary well known construction having a circular shaped head B, in which is rotatably connected the camera support C hereinafter fully described.

The camera support comprises a base 10 preferably of circular shape and having fixed to its outer periphery, at diametrically opposite sides, spaced parallel substantially L-shaped brackets 11, each being formed with spaced holes 12 for receiving the respective fasteners 13 and 14, which adjustably connect to the brackets 11 the horizontal slotted end portion 15 of outwardly arched uprights 16 formed with the upwardly tapered upper end portions 17, which are pivoted at 18 to opposite sides of a horizontally disposed adjustable frame including the U-shaped end sections 19 and side sections 20 respectively, the limbs of the end sections 19 being formed with slots 21 to receive the adjustable bolts 22 and guide members 23, which are also passed through the side sections 20, and in this manner the said frame can be increased or decreased in size to accommodate a camera 24 which is supported therein upon pivots 25 engaged in the side sections 20 of the said frame, so that the camera 24 is free for swinging movement and likewise the adjustable frame is free for swinging movement on the upright 16, whereby the camera will be sustained level irrespective of the angular disposition of the support.

The brackets 11 have connected thereto braces 26 which are also connected to the base 10, and the fasteners 13 and 14 are passed through the slots 27 formed in the horizontal ends 15 of the urights 16 so that the latter can be adjusted in accordance with the adjustment of the swinging frame having arranged therein the camera. Fixed to and depending from the bottom of the camera 24 is an electric motor 28, on the drive shaft 29 of which is adjustably fixed a pulley 30, over which is trained an endless belt or band 31, the same being also trained over a pulley wheel 32 fixed to the crank shaft 33 of the camera 24, which shaft operates the said camera for exposure in the taking of pictures.

Mounted upon one side of the camera 24 is a combined lock and circuit closer which comprises a barrel 34 in which is arranged a coiled expansion spring 35, the latter surrounding a rod 36 which is passed centrally through the said barrel 34 for sliding movement, and upon this rod is fixed a bearing or shoulder 37, against which one end of the spring 35 works, while its opposite end has its bearing against the closed end adjacent thereto of the barrel 34 so that the rod 36 is under tension. Formed at the outer end of the rod 36 is a finger eye 38, while at the opposite end of the said rod is a wedge shaped tripping extension 39 formed with a depending trip knob 40 which is adapted to engage with a locking pin 41 when the rod 36 is moved in one direction for pulling upon flexible cords 42 engaged with a pair of opposed latches 43 pivotally connected at 44 to a cross head 45 on a slidable stem 46 mounted in guides 47 on the side of the camera 24, and these latches 43 are adapted for normal locking engagement in notches 47' formed in the hub 48 at diametrically opposite points thereof on the pulley wheel 32, so that the crank shaft 33 will be locked against turning. The tripping extension 39 has its upper inclined edge 49 engageable with a pin 50 on the stem 46 so that the latter can be raised and lowered on movement of the rod 36 for the bringing of the latches 43 into locking engagement with the notches 47' or out of a position for engagement therewith.

Mounted at right angles to the path of movement of the rod 36 on the side of the camera 24 is a latch bolt 51 slidably supported in guides 52 on the camera, and to this bolt is connected a pull cord 53 which is also connected to a release stem 54 mounted in guides 55 near the top of the camera 24, the stem 54 projecting above the top in convenient reach for the operator of the machine, the bolt 51 being designed to engage in a notch 56 in the rod 36 so as to hold the same in a position to be inoperative upon the latches 43, whereby they will rest in unlocking position, thereby freeing the crank shaft of the camera for operation by the motor 28 which is arranged in a circuit including the wires 57, 58 and 59 and a battery 60 which is held within a portable case 61 adapted to rest upon a foundation or flooring contiguous to the tripod A. The wires 57 and 58 respectively are connected with switch contacts 62 and 63 respectively, the contact 62 being carried by the rod 36 while the contact 63 is mounted upon the body of the camera 24, and when the rod 36 is pulled outwardly to release the lock the contacts 62 and 63 engage with each other for the closing of the electric circuit and thereby start the motor, the contact 63 being insulated from the rod 36 which slides therethrough.

It will be apparent that irrespective of the rolling or tilting action of the marine craft, when the camera is in use and in the support hereinbefore set forth, the said camera will be sustained level at all times, thereby enabling the taking of perfect marine pictures for marine photo-plays. The camera is under perfect control of the operator thereof for making the desired exposures, and when the motor is inactive the crank shaft 33 is positively locked to prevent the working of the camera and on the unlocking of the said shaft the circuit between the battery and the motor is closed for the starting of the said motor.

From the foregoing description, taken in connection with the accompanying drawings, the construction and manner of use of the invention will be readily apparent and a more extended explanation has, therefore, been omitted.

Having thus described my invention, I claim:

A camera support comprising a rotatable base, L-shaped brackets each having the short limb secured to the base, uprights, each having the lower extremity adjustably connected to a bracket, a frame secured to the upper ends of the uprights and including adjustable connected members and pivots for connecting the upper portion of the camera to the frame.

In testimony whereof I affix my signature in presence of two witnesses.

WILLIAM A. P. CATHCART.

Witnesses:
GABRIEL AT LEE CHOW,
JEANNETTE RAYMOND.

Copies of this patent may be obtained for five cents each, by addressing the "Commissioner of Patents, Washington, D. C."